June 2, 1970   D. H. WALE   3,514,828
END-MILLING CUTTERS

Filed April 8, 1968   2 Sheets-Sheet 1

INVENTOR
DENNIS HARRY WALE
BY
ATTORNEY

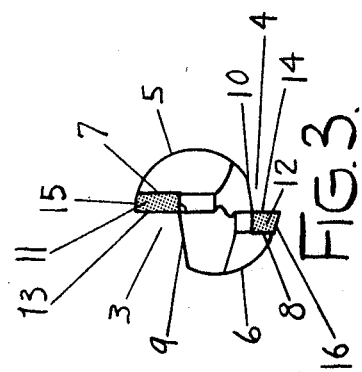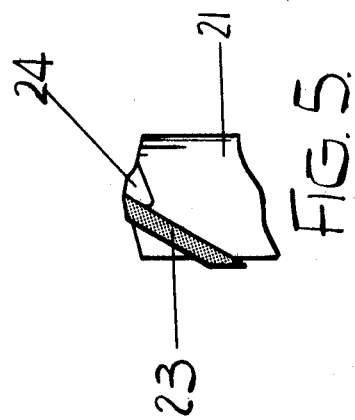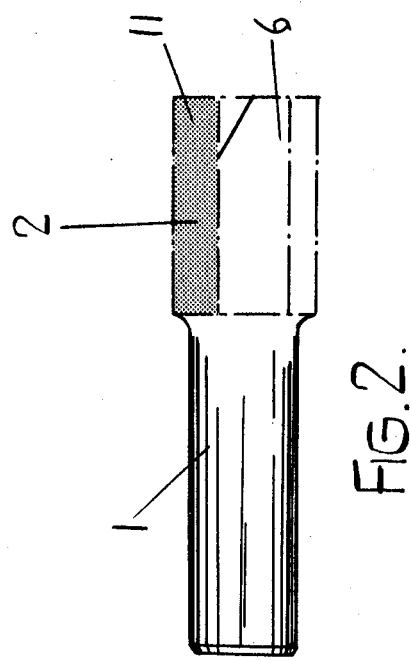

United States Patent Office 3,514,828
Patented June 2, 1970

3,514,828
END-MILLING CUTTERS
Dennis H. Wale, Woodhouse Eaves, England, assignor to Marwin Cutting Tools Ltd., Rothey, England
Filed Apr. 8, 1968, Ser. No. 719,533
Int. Cl. B26d 1/12
U.S. Cl. 29—105
7 Claims

ABSTRACT OF THE DISCLOSURE

An end-milling cutter for a machine tool having an end center portion high-speed steel cutting area with a plurality of flutes formed therein, and wear-resistant cutter members as formed of tungsten carbide or sintered ceramic mounted on said flutes.

BACKGROUND OF THE INVENTION

This invention relates to end-milling cutters for machine tools. Cutters according to the invention are suitable for key-seating, die-sinking, plunging, traversing, pocketing, routing, drilling, milling and boring non-ferrous metals such as aluminum and titanium and Nimonic (registered trademark) and alloy steels.

A cutter according to the invention has a high-speed steel body and central cutting area and strips of tungsten carbide or sintered ceramic cutting material integral therewith providing cutting edges along the flute faces. In the use of such a cutter the high speed steel provides the central area penetration and operates at a lower cutting speed than the carbide or ceramic outer area. Thus both are used under optimum conditions.

It is preferred that the carbide or ceramic strips should not all be of the same width. Thus, in use, the paths of the junctions between the different cutting materials on adjacent flutes overlap and the work-piece is not marked by the junctions. A cutter according to the invention may have two or more straight or helical flutes. In order to save expense larger-diameter cutters have a shank of cheaper material such as alloy steel butt-welded, brazed or adhering by means of an epoxy resin to the high-speed steel of the cutting area. The carbide or ceramic strips are preferably made integral with the high-speed by brazing although an epoxy resin adhesive might alternatively be used.

BRIEF DESCRIPTION OF THE DRAWINGS

FIG. 2 is a side elevation of the cutter of FIG. 1.

FIG. 3 is an end elevation of the cutter of FIGS. 1 and 2.

FIG. 5 is a part-elevation of the cutting end of the cutter of FIG. 4.

DESCRIPTION OF THE PRACTICAL EMBODIMENTS

Figure 1:
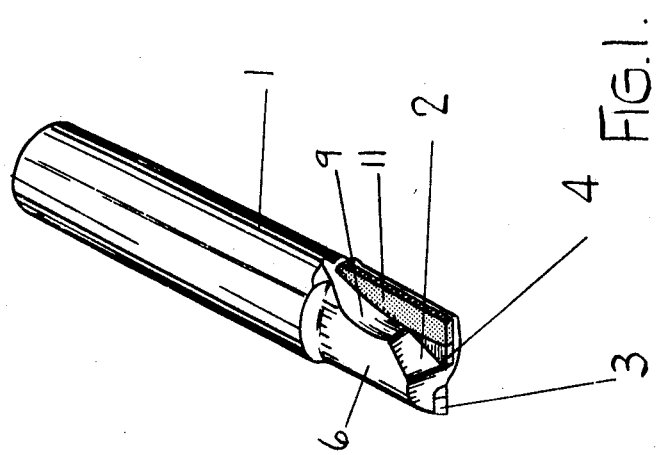
FIG. 1 is a perspective view of a cutter according to the invention having straight flutes.

Referring now by reference characters to the drawings which illustrate practical embodiments of the present invention, A generally designates an end-milling cutter comprising a cylindrical body 1 formed as of high-speed steel and incorporating on one end thereof a tip portion or cutting area 2, which latter is provided with at least two flutes 3, 4, illustrated herein in FIG. 1, as being opposed and straight in substantially axially parallel relationship. Said flutes 3, 4 are separated by intervening lands 5, 6 and each embodies an outer side, or normally cutting, face 7, 8, respectively, and a clearing face 9, 10, respectively. Secured on each flute cutting face 7, 8, as by brazing, suitable adhesive or the like, is a cutter 11, 12, respectively, of wear-resistant abrasive character being fabricated preferably of tungsten carbide or sintered ceramic. Each of said cutters 11, 12 is provided with a cutting face or edge 13, 14, respectively, which is substantially planar parallel to the adjacent flute face 7, 8, respectively, and which cutting faces 13, 14 may be mutually co-planar. As may best be seen in FIG. 3, the radial extent of cutter 11 is relatively greater than that of cutter 12 so that, in use, the paths of the junction between said cutters 11, 12 overlap thereby preventing the development in the work-piece of undesired lines of demarcation between the cutting members 11, 12. Clearing faces 9, 10 provide for proper chip clearance from body 1. Cutters 11, 12 are marginally arcuately contoured as at 15, 16 for smooth integration with the outer faces of the adjacent lands 5, 6.

Figure 4:
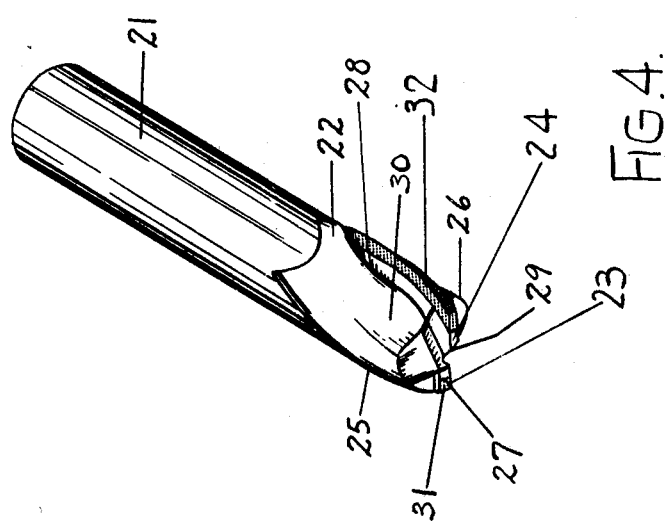
FIG. 4 is a perspective view of a cutter according to the invention having helical flutes.

Referring now to FIGS. 4 and 5, B generally designates an end-milling cutter having a body 21 with a tip portion or cutting area 22, which latter is provided with at least two opposed flutes 23, 24, with a corresponding number of intervening lands 25, 26; the said flutes and lands being in helical formation. Each flute 23, 24 is provided with an outer face 27, 28, respectively, and a clearing face 29, 30, respectively. Mounted as by brazing, suitable adhesive or the like, upon the outer face 27, 28 of each flute 23, 24 is a cutter 31, 32, which is in all respects similar to cutters 11, 12 hereinabove described in conjunction with end-milling cutter A and, hence, being of wear-resistant abrasive material, such as, especially, tungsten carbide or sintered ceramic but being of helical design for conformity with the related flute 23, 24. The said cutters 27, 28 are of different extent radially of end-milling cutter B, or of different width, to assure of overlapping in action. One class of adhesives which has been found to be especially suitable for bonding the cutters of the present invention to the related cutter body are the epoxy resins. The high-speed steel center portion of cutting area 2, or 22, as the case may be, is cutter ground past the center and backed off to permit sinking or plunge cutting.

It should be understood that changes and modifications in the formation, construction, and arrangement and combination of the several parts of the End-Milling Cutters may be made and substituted for these herein shown and described without departing from the nature and principle of my invention.

Having thus described my invention, what I claim and desire to obtain by Letters Patent is:

1. An end milling cutter for a machine tool comprising a body having a tip portion of high speed steel, at least two flutes formed in said tip portion, each flute having a face, a wear resistant, abrasive cutter member formed of tungsten carbide fixed to the face of each flute and having a cutting face substantially planarwise parallel to the related flute face, said tip portion including a high speed steel central end cutting area with cutting edges, each of said cutter members having a longitudinal cutting edge and an end cutting edge substantially perpendicular thereto, said end cutting edges being substantially in line with the high speed steel cutting edges, and said flutes and associated cutting members having different widths.

2. An end-milling cutter as defined in claim 1 and further characterized by said flutes extending longitudinally of said cutter body portion in axial parallel relationship thereto.

3. An end-milling cutter as defined in claim 1 and further characterized by said flutes being of helical formation.

4. An end-milling cutter as defined in claim 1 and further characterized by said cutter members being secured to the respective flutes by brazing.

5. An end-milling cutter as defined in claim 1 and further characterized by said cutter members being secured to the respective flutes by an adhesive.

6. An end milling cutter as defined in claim 1 and further characterized by said body portion being formed of alloy steel, said body and said tip areas being welded together.

7. An end milling cutter for a machine tool comprising a body having a tip portion of high speed steel, at least two flutes formed in said tip portion, each flute having a face, a wear resistant, abrasive cutter member formed of sintered ceramic fixed to the face of each flute and having a cutting face substantially planarwise parallel to the related flute face, said tip portion including a high speed steel central end cutting area with cutting edges, each of said cutter members having a longitudinal cutting edge substantially perpendicular thereto, said end cutting edges being substantially in line with the high speed steel cutting edges, and said flutes and associated cutting members having different widths.

References Cited

UNITED STATES PATENTS

| 1,418,485 | 6/1922 | Smith | 29—103.1 X |
|---|---|---|---|
| 1,887,373 | 11/1932 | Emmons et al. | 29—103.1 X |
| 2,950,523 | 8/1960 | Frommelt et al. | 29—103 X |

FOREIGN PATENTS

| 520,213 | 4/1940 | Great Britain. |
|---|---|---|

GIL WEIDENFELD, Primary Examiner

U.S. Cl. X.R.

77—67